United States Patent [19]
Acharya et al.

[11] Patent Number: 5,755,857
[45] Date of Patent: May 26, 1998

[54] PURIFICATION APPARATUS

[75] Inventors: Divyanshu Rasiklal Acharya. Bridgewater; Stephen John Cummins. Murray Hill, both of N.J.

[73] Assignee: The BOC Group plc. Windlesham Surrey, United Kingdom

[21] Appl. No.: 562,773

[22] Filed: Nov. 27, 1995

[30] Foreign Application Priority Data

Nov. 30, 1994 [GB] United Kingdom ............. 9424191.6

[51] Int. Cl.$^6$ ............................................. B01D 53/047
[52] U.S. Cl. ................................. 96/122; 96/130; 96/132; 96/133; 96/144; 96/152
[58] Field of Search ......................... 95/117–126, 139; 96/108, 121, 122, 129–133, 144, 152

[56] References Cited

U.S. PATENT DOCUMENTS

| | | | |
|---|---|---|---|
| 4,155,849 | 5/1979 | Baierl | 96/131 X |
| 5,071,449 | 12/1991 | Sircar | 95/122 X |
| 5,268,022 | 12/1993 | Garrett et al. | 96/130 X |
| 5,447,558 | 9/1995 | Acharya | 96/130 X |

FOREIGN PATENT DOCUMENTS

| | | | |
|---|---|---|---|
| 0509638 | 10/1992 | European Pat. Off. | 96/121 |
| 0612554 | 8/1994 | European Pat. Off. | 95/117 |
| 52-077884 | 6/1977 | Japan | 96/130 |
| 60-022918 | 2/1985 | Japan | 96/130 |
| 62-007416 | 1/1987 | Japan | 96/129 |
| 1-159019 | 6/1989 | Japan | 96/129 |
| WO94/29000 | 12/1994 | WIPO | 96/121 |

*Primary Examiner*—Robert Spitzer
*Attorney, Agent, or Firm*—Coleman R. Reap; Salvatore P. Pace

[57] ABSTRACT

An apparatus for purifying feed air by adsorption of water vapor and carbon dioxide therefrom includes a purification vessel in which are defined vertically arrange chambers and another purification vessel in which are defined vertically arranged chambers. None of the chambers is in a series flow relationship with any of the others. Each chamber contains a bed of one or more adsorbents which is able to adsorb water vapor and carbon dioxide from the feed air and which forms a reversible part of a gas flow path extending between locations external of the vessels. Valves are associated with the vessel and are operable to permit during a first adsorption period of time simultaneous flows of air to to purified through at least two of the chambers and during a second regeneration period of time simultaneous reverse flows of regeneration gas through the same chambers.

8 Claims, 1 Drawing Sheet

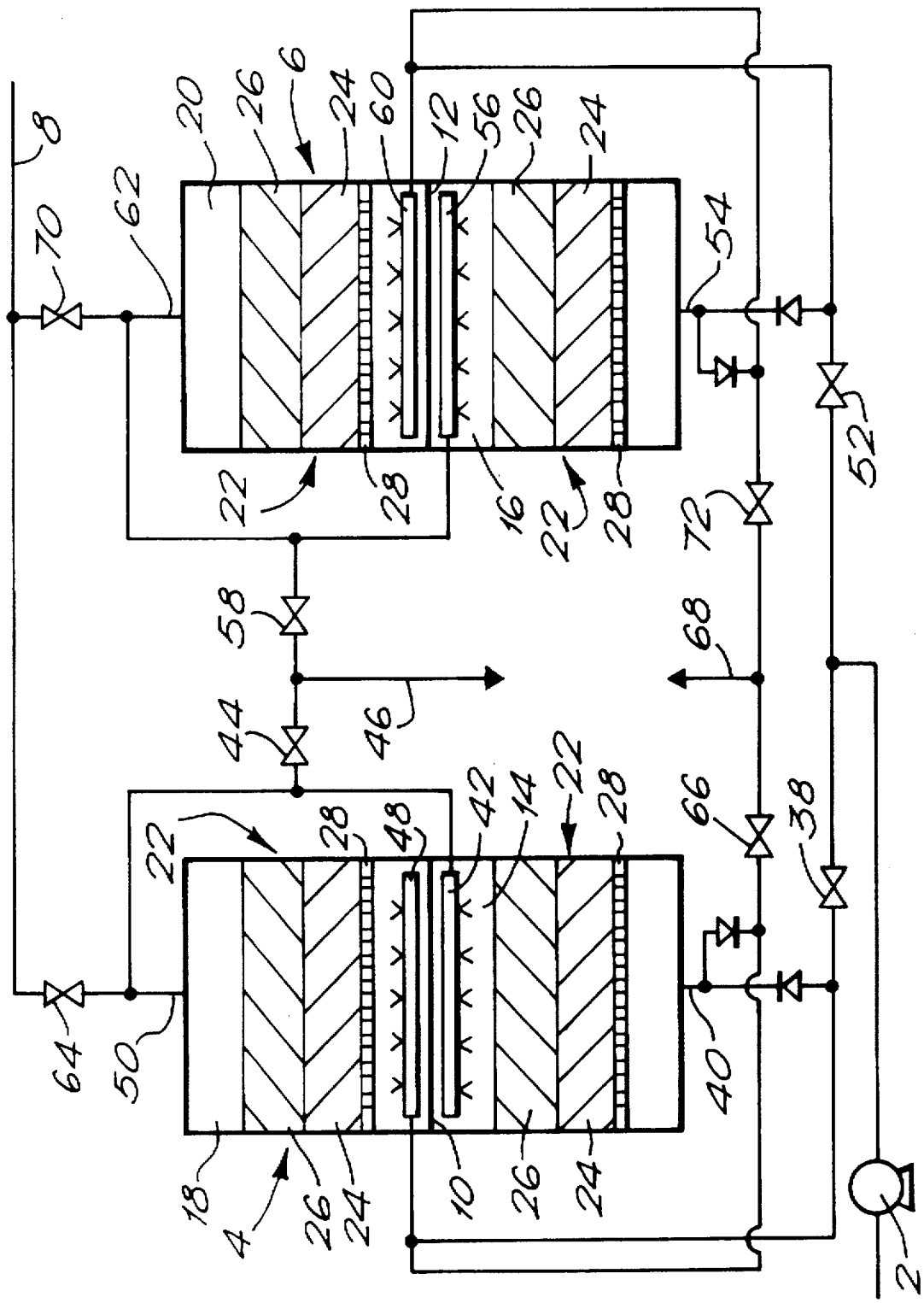

PURIFICATION APPARATUS

BACKGROUND OF THE INVENTION

This invention relates to apparatus for purifying feed air by adsorption of water vapour and carbon dioxide therefrom.

Oxygen and nitrogen are primarily produced commercially by the rectification of air. It is necessary to remove water vapour and carbon dioxide from the air upstream of the rectification. In modern plants for the separation of air by rectification this purification is accomplished by adsorption. An incoming stream of compressed air is passed through a first layer of adsorbent which preferentially adsorbs water vapour and a second layer of adsorbent which preferentially adsorbs carbon dioxide. Typically, while one pair of such layers is being used to purify incoming air, another pair is being regenerated so as to enable there always to be at least one pair of layers available for use in purifying the incoming air. In an alternative plant there is a single layer of an adsorbent capable of adsorbing both water vapour and carbon dioxide.

There is a tendency for air separation plant to be required to meet ever increasing demands for oxygen. As a result, the demands on the preliminary adsorptive purification step are becoming ever greater.

In practice, there tend for a number of reasons to be limitations on the size of the vessels in which the adsorbent layers can be contained. Accordingly, a large air separation plant typically producing at least 1000 tonnes per day of oxygen may require several adsorption vessels. There is therefore a need to improve adsorption apparatus so as to enable the productivity of the adsorption process per unit bed volume to be increased.

In a conventional adsorption process for purifying air in which the air flows axially from bottom to top through a first layer of adsorbent particles which preferentially adsorb water vapour and then through a second layer of adsorbent particles which preferentially adsorb carbon dioxide, excessive air velocities will fluidise the adsorbent layers. There is therefore a limit to the air velocity and as a result a limit to the rate at which air can be fed through an adsorbent vessel of a chosen size.

EP-A-0 612 554 discloses a method of purifying a feed gas stream containing impurities comprising water vapour and carbon dioxide, comprising repeating in sequence the steps of:

a) passing the feed gas stream in sequence upwardly through a first particulate bed comprising first adsorbent which preferentially adsorbs water vapour therefrom and downwardly through a second particulate bed comprising second adsorbent which preferentially adsorbs carbon dioxide therefrom and b) passing a regeneration gas for each bed in a direction countercurrent to that of the flow of the feed gas so as to regenerate the beds by causing desorption of previously adsorbed water vapour and carbon dioxide.

Although the process according to EP-A-0 612 554 makes possible a reduction in the regeneration time and savings of thermal energy, it is not particularly suitable for use if it is desirable to minimise pressure drop through the adsorbent during the adsorption steps of the sequence there is not necessarily a concomitant reduction in size of the adsorption vessels necessary for performing the process since the process requires separate beds for the adsorption of carbon dioxide and water vapour.

GB-A-477 657 discloses with reference to its accompanying FIG. 1 an adsorption process in which, during adsorption, the entire feed is admitted to an adsorption vessel. A part of the flow passes upwardly through a lower bed while simultaneously another part of the feed bypasses the lower bed by flow through an internal passage and flows downwardly through an upper bed. There is described with reference to its accompanying FIG. 2 a similar arrangement in which, during adsorption, flow through both beds is vertically upwards. In both embodiments there is a common flow division arrangement located internally of the vessel. Difficulties will therefore arise in balancing the gas flow between the two beds. Further, there is no disclosure of using apparatus disclosed in GB-A-477 657 to purify air.

It is an aim of the present invention to provide apparatus for purifying air by the adsorptive removal of water vapour and carbon dioxide which for a given duty is able to use a smaller vessel or vessels than in comparable conventional air purification plant or in comparable air purification plant according to EP-A-0 612 554.

SUMMARY OF THE INVENTION

According to the present invention there is provided apparatus for purifying feed air by adsorption of water vapour and carbon dioxide therefrom comprising at least one vessel in which are defined a plurality of vertically-arranged chambers, none of the chambers being in a series flow relationship with any other of the chambers, each chamber containing a bed of one or more adsorbents which is able to adsorb water vapour and carbon dioxide from the feed air and which forms a reversible part of a gas flow path extending intermediate locations external of the vessel; and valves associated with the vessel operable to permit during a first adsorption period of time simultaneous flows of air to be purified through at least two of the chambers, and during a second regeneration period of time simultaneous reverse flows of regeneration gas through the same chambers.

In comparison with conventional apparatus for purifying feed air by adsorption, splitting the flow of the feed air to be purified between two or more chambers enables individual bed depths to be reduced for a given adsorption duty with the result that the overall pressure drop of the air through the adsorbent or adsorbents is able to be reduced. Thus average feed air pressure during the adsorption step is greater than in a comparable conventional process and hence more air can be processed for a given vessel size and/or the diameter of the vessel can be reduced without increasing individual bed depth to a height greater than employed in conventional comparable processes.

The apparatus according to the invention makes it simple to control the air flow to the respective chambers of the vessel because all control equipment is able to be made to standard design and to be located outside the vessel such that it is readily accessible for routine maintenance.

Preferably, the vessel contains one or more laminar partitions that each extend horizontally and each form a common wall between a pair of contiguous chambers. The or each partition is preferably not a load-bearing member and preferably comprises a thin sheet of metal. Typically, the or each sheet is secured fluid-tight to the internal periphery of the vessel by a weld or welds and is therefore preferably formed of a metal or alloy of the same or similar composition to that of the vessel wall or walls defining said internal periphery. In order to minimise fabrication costs the metal sheet may be of such thinness that it is capable of flexing when subjected to a pressure differential thereacross. If such a partition is employed, it is accordingly desirable to arrange the apparatus such that it is not subjected during normal operation to any pressure differential which would cause it to flex.

Typically, depending on the flow rate of the feed air, the apparatus according to the invention includes a plurality of the vessels each containing the same number of said chambers. Preferably, the valves associated with the chambers are operable such that at any one time during normal operation only some of the chambers are placed in communication with a source of the feed air to be purified. With such an arrangement, it is possible to purify a continuous flow of air, since time is available to regenerate the adsorbent or adsorbents in chambers during a period in which other chambers are adsorbing impurities from the feed air, the feed air being switched to chambers housing regenerated adsorbent preferably at regular predetermined intervals.

Preferably, the valves are operable such that all the chambers in any one vessel are able to be subjected to the same cycle of operations in phase with one another. In this way, the creation of pressure differentials across the or each partition can be avoided with the result that a thin sheet of flexible material can be selected for the fabrication of the or each partition. Alternatively or in addition, a source of regeneration gas may typically be employed at substantially the same pressure as the feed air. Thus, the apparatus according to the invention may be arranged to perform a purification cycle which regenerates the adsorbent beds at substantially the same pressure at which adsorption is conducted. Accordingly, the apparatus according to the invention is preferably adapted to perform a temperature swing or concentration swing adsorption cycle rather than a pressure swing adsorption cycle. The terms "pressure swing adsorption" and "temperature swing adsorption" are well known in the art. The term "concentration swing adsorption" refers to a process or cycle in which desorption is effected by subjecting an adsorbent loaded with adsorbed component to a purge gas having a concentration of the adsorbed component substantially lower than its concentration in the feed gas but in which the desorption pressure and temperature are similar to or the same as the adsorption pressure and temperature.

In a process for separating air by rectification, the source of regeneration gas is typically a fractionation or rectification column for separating air which operates at substantially the same pressure as that at which water vapour and carbon dioxide are adsorbed in operation of the apparatus according to the invention.

Each chamber preferably has a drain having an inlet communicating with a lower region thereof and an outlet communicating with the exterior of the vessel in which said chamber is located. Any water vapour condensate formed during regeneration can thereby be drained during operation and thus the possibility of liquid water contaminating the bottom adsorbent in the chamber can be avoided.

Preferably the apparatus according to the invention is arranged such that during operation the direction of feed air flow through at least some of the then adsorbing beds is upward.

If it is important to keep pressure drop during adsorption to a minimum it is desirable that all the feed air flow through the beds is in the upward direction. If it is not so important to keep pressure drop during adsorption to a minimum, the apparatus may be arranged such that during operation the direction of feed air flow through at least some of the adsorbing beds is downward. Such downward adsorption may be performed with smaller particle size adsorbent than upward adsorption for a given gas velocity without risk of fluidising the bed in which the adsorption is performed. (Alternatively, if larger particle sizes are used, a higher feed velocity can be employed.) Since adsorption tends to be more efficient with decreasing particle size, the amount of adsorbent required to perform a particular adsorption duty is less when downflow adsorption is employed in preference to upflow adsorption.

BRIEF DESCRIPTION OF THE DRAWING

The attached drawing is an illustration of the apparatus of the invention.

DETAILED DESCRIPTION OF THE INVENTION

Preferably, each bed comprises in the direction of adsorption an upstream layer of silica or activated alumina particles (or gel) which adsorbs water vapour and a downstream layer of zeolite adsorbent (e.g. zeolite 13×) which adsorbs carbon dioxide. In upflow adsorption, the upstream layer is the lower one; in downflow adsorption, the upstream layer is the upper one.

Preferably each bed has a depth in the range of 1 to 1.5 meters.

Apparatus according to the invention will now be described by way of example with reference to the accompanying drawing, which is a schematic flow diagram of an adsorption apparatus.

The drawing is not to scale.

Referring to the accompanying drawing, there is shown an apparatus for purifying air comprising an air compressor 2 which acts as the source of pressurised air to be purified, essentially identical purification vessels 4 and 6, and a regeneration gas pipeline 8 communicating with a source of regeneration gas (typically nitrogen). The vessels 4 and 6 are arranged in parallel. The apparatus is provided with several stop valves and associated pipework to be described below which enables each vessel 4 and 6 to perform a cycle of operations effective to purify the air.

The vessels 4 and 6 each take the form of a cylindrical pressure vessel with its longitudinal axis vertically disposed. Vessels 4 and 6 are divided respectively by thin laminar partitions 10 and 12 respectively into lower chambers 14 and 16 respectively and upper chambers 18 and 20 respectively. There is no fluid in series communication between the lower chamber 14 and the upper chamber 18 of the vessel 4 or between the lower chamber 16 and the upper chamber 20 of the vessel 6.

The chambers 14, 16, 18 and 20 each house a bed 22 of adsorbent comprising a lower layer 24 of activated alumina particles that adsorb water vapour in preference to other components of the incoming air and an upper layer 26 of particles of zeolite 13× molecular sieve that adsorb carbon dioxide in preference to other components of the incoming air. The beds 22 are each supported on a respective gas distribution grid 28.

Each of the chambers 14, 16, 18 and 20 lies on two gas flow paths, either one of which is able to be selected. One of the flow paths is for compressed air to be purified by adsorption of water vapour and carbon dioxide therefrom. The adsorption flow path on which the chamber 14 lies extends from the compressor 2, through a stop valve 38, through an inlet port 40 at the bottom of the vessel 4, upwardly through the bed 22 in the chamber 14, through a gas collector-cum-distributor 42 which in operation is able to collect the gas issuing from the top of the bed 22 in the chamber 14 and pass the gas to outside the vessel 4, through a stop valve 44 communicating with the gas collector-cum-distributor 42, to a purified air pipeline 46 communicating with the outlet side of the valve 44. The chamber 18 lies on an analogous adsorption flow path. This flow path extends from the compressor 2 through the valve 38, through a gas collector-cum-distributor 48 into the chamber 18 itself, upwardly through the bed 22 in the chamber 18, at the top of the vessel 4, through a port 50, and through the stop valve 44 to the pipeline 46.

The adsorption flow path on which the chamber 16 lies extends from the compressor 2 through a stop valve 52, through a port 54 at the bottom of the vessel 6 into the chamber 16 itself, upwardly through the bed 22 in the chamber 16, through another gas collector-cum-distributor 56 to outside the vessel 6, through a stop valve 58 communicating with the gas collector-cum-distributor 56, and from the stop valve 58 to the purified air pipeline 46. The chamber 20 lies on an analogous adsorption flow path for compressed air which extends from the compressor 2 through the stop valve 52, through a gas collector-cum-distributor 60 into the chamber 20 itself, upwardly through the bed 22 in the chamber 20, through a gas port 62 in the vessel 6, and through the stop valve 58 to the purified air pipeline 46.

As mentioned above, each of the chambers 14, 16, 18 and 20 lie on an alternative regeneration gas flow path. The chamber 12 lies on a regeneration gas flow path extending from the pipeline 8 for regeneration gas through a stop valve 64 communicating therewith through the gas collector-cum-distributor 42 into the chamber 14, downwardly through the bed 22, through the gas port 40 at the bottom of the vessel 4, to a stop valve 66 communicating therewith and through the stop valve 66 to an exhaust gas pipeline 68 which may for example communicate with the atmosphere. The chamber 18 lies on an analogous flow path which extends from the regeneration gas pipeline 8 through the stop valve 64, through the port 50 at the top of the vessel 4 into the chamber 18, downwardly through the bed 22 in the chamber 18, through the gas collector-cum-distributor 48, through the stop valve 66 and into the exhaust pipeline 68.

The regeneration gas flow path on which the chamber 16 lies extends from the regeneration gas pipeline 8 through a stop valve 70, through the gas distributor-cum-collector 56 into the chamber 16, downwardly through the bed 22 in the chamber 16, through the port 54 at the bottom of the vessel 6 to outside the vessel 6, through a stop valve 72 communicating with the port 54, and from the stop valve 72 to the exhaust gas pipeline 68. The chamber 20 lies on an analogous regeneration gas flow path extending from regeneration gas pipeline 8 through the stop valve 70, through the gas port 62 at the top of the vessel 6 into the chamber 20, downwardly through the bed 22 in the chamber 20, out of the chamber 20 via the gas collector-cum-distributor 60, and through the stop valve 72 to the exhaust gas pipeline 68.

The apparatus may if desired include various non-return valves as shown in the drawing at the inlet ends of vessels 4 and 6.

In operation, the vessels 4 and 6 are operated alternately to remove water vapour and carbon dioxide from the incoming compressed air. Thus, in one cycle of operations the stop valves 38 and 44 are open and the stop valves 52, 58, 64 and 66 are in their closed position. The valves 70 and 72 may either be in open or closed positions as will be described below. With the valves 38 and 44 open one part of the compressed air from the compressor 2 is purified by passage through the chamber 14 while the rest of the air is purified by passage through the chamber 18. Preferably, it is arranged that the flow rates through the chambers 14 and 18 are equal to one another during this adsorption phase of the cycle. Water vapour and possibly some carbon dioxide are adsorbed in the layer 24, and remaining carbon dioxide in the layer 26. When the adsorbent is saturated with the water vapour and carbon dioxide impurities, the valves 38 and 44 are closed and the incoming air is switched to the vessel 6. Accordingly, simultaneously with the closing of the valves 38 and 44 the valves 52 and 58 are opened. Moreover, if the valves 70 and 72 were previously in their open positions, these valves are closed. The compressed air is then purified in the vessel 6. Thus, a continuous stream of purified compressed air may be produced.

For at least part of the period in which the vessel 4 is not receiving air for purification, it is subjected to the flow therethrough of a dry, carbon dioxide free regeneration gas, for example, nitrogen at elevated temperature, for example a temperature in the range of 100° to 200° C.; likewise, the adsorbent in the vessel 6 may be regenerated during at least part of the period in which the air is purified in the vessel 4. Regeneration is effected by flow of the hot regeneration gas downwardly through the adsorbent layers 26 and 24 in the respective chambers. The regeneration gas causes water vapour and carbon dioxide to be desorbed from the adsorbent layers and then flushes the desorbed gas out of the chambers into the exhaust gas pipeline 46. The regeneration gas is preferably created by passing a stream of nitrogen at ambient temperature through a heater in order to raise the temperature to the desired level. Once regeneration has been completed it will be desirable to return the beds again to approximately ambient temperature. This can be effected by causing the regeneration gas to bypass the heater and enter the beds at ambient temperature. Thus, the flow of regeneration gas is continued until the beds have returned to approximately ambient temperature. During the period in which regeneration gas flows through the vessel 4, the valves 64 and 66 are open and during the period in which the regeneration gas flows through the vessel 6, the valves 70 and 72 are open.

Various changes and modifications may be made to the illustrated apparatus. For example, the chambers 16 and 20 may be arranged for downflow adsorption but upflow regeneration. Alternatively or in addition, the vessels 4 and 6 may each contain more than two chambers and/or there may be additional vessels included in the illustrated apparatus.

Typically, each chamber has a drain associated therewith to enable any condensing water vapour to be run off during regeneration of the beds.

The illustrated apparatus typically includes flow control valves (not shown) which are manually operable and may be set to give a desired gas flow rate through each chamber.

The stop valves are preferably automatically actuated by a central controller (not shown) in accordance with a predetermined schedule of valve openings and closings.

The method and apparatus according to the invention are further illustrated by the following examples. In Example 1, an apparatus of the kind shown in the drawing is used. In Example 2, the directions of adsorption and regeneration are reversed. Thus, in Example 2, there is downflow adsorption and upflow regeneration. Accordingly, in Example 2, each bed of adsorbent comprises a lower layer of zeolite molecular sieve, and an upper layer of activated alumina.

In the Examples set out below, "AA" means activated alumina; "13×" means zeolite 13× molecular sieve adsorbent and "bead size" refers to the average size of the beads or pellets of adsorbent.

EXAMPLE 1

| Feed Conditions | |
|---|---|
| Air Flow rate, sm³/hr | 240,000 |
| Air Pressure, bara | 11 |
| Air Temperature, °C. | 5 |
| Vessel operating parameters | |
| Adsorbent | |
| AA | 3 mm (⅛") beads |
| 13X | 3 mm (⅛") beads |
| Bed Diameter, m | 4.65 |
| Bed Height, m/chamber | 1.00 |
| Bed Weight, | |
| AA kg/bed | 10,200 |
| 13X kg/bed | 14,000 |
| Adsorption Time, hours | 2.0 |
| Regeneration Temperature, °C. | 150 |
| Regeneration Flow, % feed flow | 12 |
| Regeneration Pressure, bara | 1.03 |

EXAMPLE 2

| Feed Conditions | |
|---|---|
| Air Flow rate, sm³/hr | 305,000 |
| Air Pressure, bara | 6.5 |
| Air Temperature, °C. | 5 |
| Vessel operating parameters | |
| Adsorbent | |
| AA | 3 mm (⅛") beads |
| 13X | 3 mm (⅛") beads |
| Bed Diameter, m | 4.90 |
| Bed Height, m/chamber | 1.60 |
| Bed Weight, | |
| AA kg/bed | 10,200 |
| 13X kg/bed | 32,000 |
| Adsorption Time, hours | 2.0 |
| Regeneration Temperature, °C. | 150 |
| Regeneration Flow, % feed flow | 20 |
| Regeneration Pressure, bara | 1.03 |

We claim:

1. Apparatus for purifying feed air by adsorption of water vapour and carbon dioxide therefrom comprising at least one vessel in which are defined a plurality of vertically arranged chambers, said chambers being separated from one another by non load-bearing fluid-tight partitions, each chamber containing a bed of one or more adsorbents which is able to adsorb water vapour and carbon dioxide from the feed air and which forms a reversible part of gas flow path extending intermediate locations external of said vessel; and valves associated with said vessel operable to permit during a first adsorption period of time simultaneous flows of air to be purified through at least two of the chambers, and during a second regeneration period of time simultaneous reverse flows of regeneration gas through the same chambers.

2. Apparatus as claimed in claim 1, in which said at least one vessel comprises more than one vessel, all of such vessels containing the same number of chambers.

3. Apparatus as claimed in claim 1, having means operable to permit all the chambers in any one vessel to be subjected to the same cycle of operations in phase with one another.

4. Apparatus as claimed in claim 1, additionally including a source of regeneration gas at the same pressure as the feed air.

5. Apparatus as claimed in claim 4, in which the source of regeneration gas is a rectification or fractionation column for separating air.

6. Apparatus as claimed in claim 1, having means operable to enable the air to be purified by temperature swing or concentration swing adsorption.

7. Apparatus as claimed in claim 1, in which the apparatus is arranged such that during operation the direction of feed air flow through at least some of the then adsorbing beds is upward.

8. Apparatus as claimed in claim 1, in which each bed comprises in the direction of adsorption an upstream layer of silica or activated alumina which adsorbs water vapour and a downstream layer of zeolite adsorbent which adsorbs carbon dioxide.

* * * * *